US010492056B2

(12) United States Patent
Targali

(10) Patent No.: US 10,492,056 B2
(45) Date of Patent: Nov. 26, 2019

(54) ENHANCED MOBILE SUBSCRIBER PRIVACY IN TELECOMMUNICATIONS NETWORKS

(71) Applicant: T-Mobile USA, Inc., Bellevue, WA (US)

(72) Inventor: Yousif Targali, Sammamish, WA (US)

(73) Assignee: T-Mobile USA, Inc., Bellevue, WA (US)

(*) Notice: Subject to any disclaimer, the term of this patent is extended or adjusted under 35 U.S.C. 154(b) by 0 days.

(21) Appl. No.: 15/623,947

(22) Filed: Jun. 15, 2017

(65) Prior Publication Data

US 2018/0367978 A1  Dec. 20, 2018

(51) Int. Cl.
| | |
|---|---|
| *H04W 8/06* | (2009.01) |
| *H04W 8/20* | (2009.01) |
| *H04L 29/06* | (2006.01) |
| *H04L 9/32* | (2006.01) |
| *H04W 12/06* | (2009.01) |

(Continued)

(52) U.S. Cl.
CPC .............. *H04W 8/06* (2013.01); *H04L 9/3268* (2013.01); *H04L 63/0442* (2013.01); *H04L 63/0823* (2013.01); *H04W 8/16* (2013.01); *H04W 8/20* (2013.01); *H04W 12/02* (2013.01); *H04W 12/06* (2013.01); *H04L 63/0428* (2013.01); *H04L 63/1433* (2013.01); *H04L 2209/80* (2013.01); *H04W 60/00* (2013.01)

(58) Field of Classification Search
CPC .............. H04L 9/3268; H04L 63/0442; H04L 63/0428; H04L 63/0823; H04L 63/1433; H04L 2209/80; H04W 8/06; H04W 8/20; H04W 12/02; H04W 12/06; H04W 12/001; H04W 12/007; H04W 12/0602; H04W 12/0605; H04W 12/0608; H04W 12/0609

See application file for complete search history.

(56) References Cited

U.S. PATENT DOCUMENTS

| 6,603,968 B2 * | 8/2003 | Anvekar ............... H04W 8/183 455/433 |
| 6,708,033 B1 * | 3/2004 | Linkola .................. H04W 8/18 455/407 |

(Continued)

FOREIGN PATENT DOCUMENTS

KR          20160083103 A      7/2016

OTHER PUBLICATIONS

"3GPP; Technical Specification Group Services and System Aspects; 3GPP System Architecture Evolution (SAE); Security architecture (Release 14)", 3GPP TS 33.401 V14.2.0, Mar. 17, 2017. See section 6.

(Continued)

*Primary Examiner* — Dinh Nguyen
(74) *Attorney, Agent, or Firm* — Han Santos, PLLC

(57) ABSTRACT

Techniques are disclosed for enhancing mobile subscriber privacy in telecommunications networks. In some embodiments, in the course of a registration process, a user device and an associated telecommunications network exchange trust indicators (TrIs), and respectively verify them. The user device and telecommunications network also transmit personally identifiable information (PII), such as an International Mobile Subscriber Identity (IMSI), in an encrypted form, and use a pseudo IMSI in place of the IMSI for the duration of the session.

20 Claims, 5 Drawing Sheets

(51) Int. Cl.
*H04W 12/02* (2009.01)
*H04W 8/16* (2009.01)
*H04W 60/00* (2009.01)

(56) References Cited

U.S. PATENT DOCUMENTS

| | | | | |
|---|---|---|---|---|
| 2002/0197991 | A1* | 12/2002 | Anvekar | H04W 8/183 455/432.1 |
| 2003/0115261 | A1* | 6/2003 | Mohammed | H04L 63/083 709/203 |
| 2003/0227899 | A1* | 12/2003 | McCann | H04Q 3/0025 370/349 |
| 2005/0176407 | A1* | 8/2005 | Tuomi | H04L 63/083 455/411 |
| 2008/0127320 | A1* | 5/2008 | De Lutiis | H04L 29/12216 726/9 |
| 2009/0191844 | A1* | 7/2009 | Morgan | H04W 12/06 455/411 |
| 2012/0142315 | A1* | 6/2012 | Chung | H04L 63/0869 455/411 |
| 2012/0159576 | A1* | 6/2012 | Wang | H04L 12/6418 726/3 |
| 2013/0012168 | A1* | 1/2013 | Rajadurai | H04L 9/0822 455/411 |
| 2013/0170643 | A1* | 7/2013 | Xiao | H04L 63/08 380/270 |
| 2016/0094542 | A1 | 3/2016 | Lee et al. | |
| 2016/0262015 | A1 | 9/2016 | Lee et al. | |
| 2016/0294783 | A1* | 10/2016 | Piqueras Jover | H04L 63/0442 |
| 2016/0381548 | A1* | 12/2016 | Lauer | H04W 12/06 455/431 |
| 2017/0111792 | A1 | 4/2017 | Fernandes et al. | |
| 2017/0264439 | A1* | 9/2017 | Muhanna | H04L 9/0861 |

OTHER PUBLICATIONS

International Search Report and Written Opinion for PCT Application No. PCT/US2018/036774 dated Sep. 27, 2018, 13 pages.

* cited by examiner

ENHANCED MOBILE SUBSCRIBER PRIVACY IN TELECOMMUNICATIONS NETWORKS

BACKGROUND

User devices (sometimes referred to as user equipment, or UE), such as cellular telephones, may connect to a variety of wireless telecommunications networks that are operated by different companies. These telecommunications networks may be cellular networks that operate according to a variety of protocols, such as a Long-Term Evolution (LTE), a Voice Over LTE (VoLTE), a LTE in unlicensed spectrum (LTE-u), or a fifth generation mobile network (5G) protocol. In the course of a user device registering to, and communicating via, a telecommunications network, information that identifies a user of the user device may be conveyed between the user device and the telecommunications network.

BRIEF DESCRIPTION OF THE DRAWINGS

The Detailed Description is set forth with reference to the accompanying Figures.

DETAILED DESCRIPTION

Overview

Figure 1:
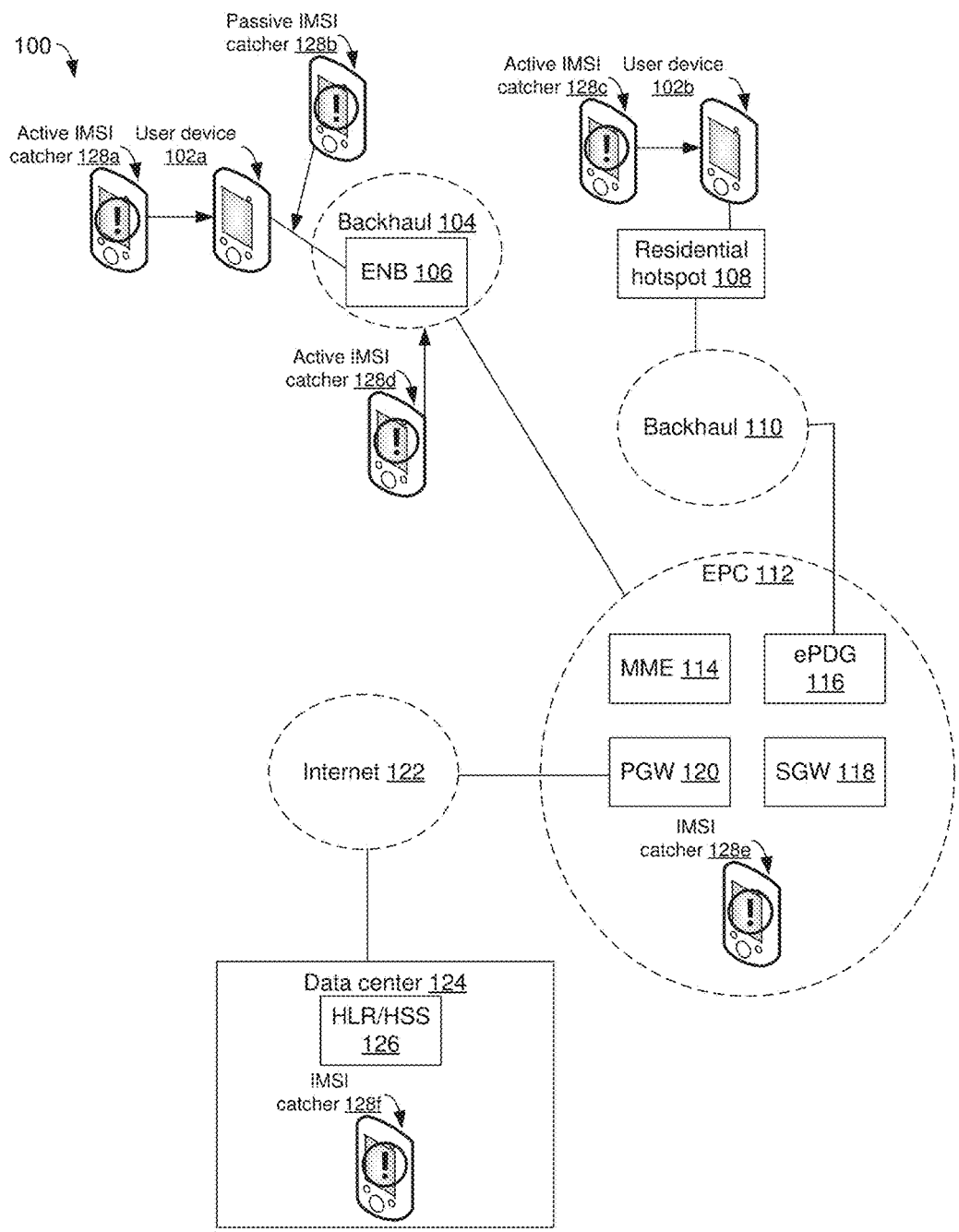
FIG. 1 illustrates an example network architecture for a telecommunications network that provides for enhanced mobile subscriber privacy.

In the process of a user device registering to, and communicating via a telecommunications network, the user device may provide personally identifiable information (PII) to the telecommunications network, which is used to identify the user device. As used herein user device may be a feature phone, a smartphone, a tablet computer, a phablet, an embedded computer system, or any other device that is capable of using the wireless communication services that are provided by multiple types of communication networks.

This PII may comprise an International Mobile Subscriber Identity (IMSI), an International Mobile Equipment Identity (IMEI), or a Mobile Subscriber International Subscriber Directory Number (MSISDN). The IMSI may comprise a 14- or 15-digit number, which is stored on a Subscriber Identity Module (SIM) card that is inserted into the user device and stored in the Home Operator Database (e.g., a Home Location Register (HLR), or a Home Subscriber Server (HSS)). If an attacker obtains access to view communications across the telecommunications network, then the attacker may identify a particular user based on the IMSI associated with his or her user device. Since user devices are connected to specific physical points on the telecommunications network (e.g., a cell tower or a residential hotspot), the attacker may use this IMSI to determine, and track, where a user is physically located.

A solution to this problem of attackers being able to track users, then, is to prevent attackers from obtaining and monitoring IMSIs. One solution is to encrypt the IMSI. For example, using public key cryptography, when the IMSI is transmitted, it may be encrypted with the public key of the destination device, e.g., the public key of the user device, serving network (a portion of a telecommunications network that communicates directly with the user device; when the user device is roaming, the serving network is a visited network), or home network. Then, that destination, e.g., the user device, serving network, or home network—may decrypt the IMSI using its private key.

However, a problem with this encryption approach is that it may open an attack vector of a distributed denial-of-service (DDoS) attack. One or more user devices could launch a DDoS attack against a HLR or a HSS) of a home network, by sending encrypted fake IMSIs during a registration process. Where the HLR/HSS is configured to decrypt the IMSIs, and other components of the telecommunications network are not so configured, then the HLR/HSS spends computing resources on decrypting these fake IMSIs, and may become overloaded doing so.

The matter of a DDoS attack may be mitigated by including a Trust Indicator (TrI) field in the communications process between a user device and the serving and home networks. The use of a trust indicator may generally be divided into two scenarios: where the user device trusts the serving network, and where the user device does not trust the serving network.

Where the user device trusts the serving network, the user device may begin a registration process, and receive a trust indicator for the serving network from the serving network. The user device may then verify this trust indicator. Then, the user device may send an encrypted IMSI and a trust indicator for the user device to the serving network. The IMSI may be encrypted such that the serving network may decode it. The serving network may send the decoded IMSI and the trust indicator for the user device to the home network, which verifies the user device's trust indicator. Then, the home network sends a pseudo IMSI to the user device.

This pseudo IMSI may comprise a substitute for the IMSI that may be used in place of the IMSI to identify the user device for the duration of the user device's communication session with the telecommunications network. If the user device re-register with the telecommunications network at some point in the future, then a new pseudo IMSI may be utilized. By changing the pseudo IMSI with each registration, even if an attacker does obtain one pseudo IMSI, that knowledge will be of time-limited value since the pseudo IMSI will change upon a new registration.

The other general scenario for using a trust indicator is where the user device does not trust the serving network. Here, the user device may verify the serving network's trust indicator as before. Then, the user device encrypts the IMSI such that the home network may decode the IMSI, but the serving network lacks configuration to decode the IMSI. The serving network sends the encrypted IMSI to the home network, in turn, the home network decodes the encrypted IMSI. Additionally, in contrast to a scenario where the user device trusts the serving network, the home network encrypts the pseudo IMSI such that the user device may decode the pseudo IMSI, but the serving network lacks configuration to decode the pseudo IMSI. The user device decodes and verifies the pseudo IMSI to complete the registration process.

While the embodiments described herein generally focus on the use of an IMSI, it may be appreciated that these techniques may be applied to other forms of PII.

Exemplary Hardware, Software and Communications Environment

FIG. 1 illustrates an example network architecture 100 for a telecommunications network that provides for enhanced mobile subscriber privacy. It may be appreciated that this Figure shows an example of a network architecture, and that there may be other network architectures in which enhanced mobile subscriber privacy may be implemented. As depicted, there are two user devices in example network architecture 100—user device 102a and user device 102b.

User device 102a connects to evolved node B (eNB) 106, which is part of backhaul 104. Backhaul 104 (and backhaul 110) comprises a communications connection between a core of a telecommunications network and an edge to which a user device may connect. eNB 106 is a point in a telecommunications network that connects with user devices, such as user device 102a. eNB 106 may send and receive wireless communications with user device 102a. eNB 106 is connected with Mobile Management Entity (MME) 114 of Evolved Packet Core (EPC) 112. MME 114 is configured to find, route, maintain, and transfer communications. MME 114 is configured to perform end-to-end connection signaling and security services between core networks, and to maintain connection information about user devices, and determine which gateway is to be used to connect a user device to another network.

MME 114 is connected with Serving Gateway (SGW) 118. SGW 118 is configured to route and forward data packets, and act as an anchor for network connectivity when user device 102a physically moves so is handed off from eNB 106 to another eNB (not shown). A user device, such as user device 102a, may be associated with a single SGW, such as SGW 118, and MIME 114 may determine that user device 102a will utilize SGW 118 for a current session. In an architecture that includes a visited network and a home network, SGW 118 is also configured to be a point of contact the visited network with the home network, by communicating with a packet gateway (PGW) (such as PGW 120) of the home network.

In addition to being configured to be a point of contact between the visited network and the home network, PGW 120 is configured to perform such functions as managing quality of service (QoS) for communications, performing deep packet inspection, and performing a Policy and Charging Enforcement Function (PCEF).

PGW 120 communicates with data center 124 via Internet communications network 122. Data center 124 may include HLR/HSS 126, which in some examples may be a HLR or a HSS. HLR/HSS 126 is a master user database that contains subscriber profiles for one or more user device users that are associated with the home network, performs authentication and authorization for a user's user device, and may provide information about a user device's physical location and Internet Protocol (IP) information.

The other user device e.g., user device 102b, is also communicatively coupled to HLR/HSS 126, though via a different path through this system architecture of FIG. 1 than for user device 102a. User device 102b is communicatively coupled to residential hotspot 108. Residential hotspot is configured to provide a WiFi or cellular wireless communications link between user device 102b and HLR/HSS 126.

Residential hotspot 108 is connected through backhaul 110 (which is similar to backhaul 104) to EPC 112, and may connect to EPC 112 via ePDG 116. ePDG 116 may secure a data transmission with a user device, such as user device 102b, as it connects to EPC 112 via a communications link that does not adhere to a $3^{rd}$ Generation Partnership Project (3GPP) protocol. In this capacity, ePDG 116 may serve as a termination node of an IPsec tunnel that is established with user device 102b.

Also present in this example network architecture 100 are six attackers, IMSI catcher 128a, IMSI catcher 128b, IMSI catcher 128c, IMSI catcher 128d, IMSI catcher 128e, and IMSI catcher 128f. Each of these IMSI catchers may be implemented via hardware (such as computing device 200 of FIG. 2) or software components that are implemented on hardware. Each of these IMSI catchers is present at a different point in example network architecture 100, but serves the same function, i.e., it is configured to capture a mobile subscriber's PII, such as an IMSI.

IMSI catcher 128a is depicted as hardware or software. The IMSI catcher 128a is active because it actively tries to obtain the IMSI of user device 102a by emulating fake or rogue base station and tricks user device 102a to connect to it instead of connecting with a real base station ENB 106. Then, IMSI catcher 128b is depicted as a computing device that is configured to capture an IMSI transmitted between user device 102a and eNB 106. IMSI catcher 128b may be considered to be a passive IMSI catcher, in contrast to the active IMSI catcher of IMSI catcher 128a.

IMSI catcher 128c is depicted as hardware or software that is configured to capture an IMSI transmitted between user device 102b and residential hotspot 108. IMSI catcher 128d is depicted as hardware that is configured to capture an IMSI as it is transmitted through backhaul 104. IMSI catcher 128e is depicted as hardware that is configured to capture an IMSI as it is transmitted through EPC 112. IMSI catcher 128f is depicted as hardware that is configured to capture an IMSI as it is transmitted through data center 124.

Each of these six IMSI catchers may be utilized by an attacker to compromise mobile subscriber data. To prevent comprised mobile subscriber data, network architecture 100 may be configured to implement one or more of the signal flows of FIGS. 3-4 and the operating procedures of FIG. 5, as described herein.

Figure 2:
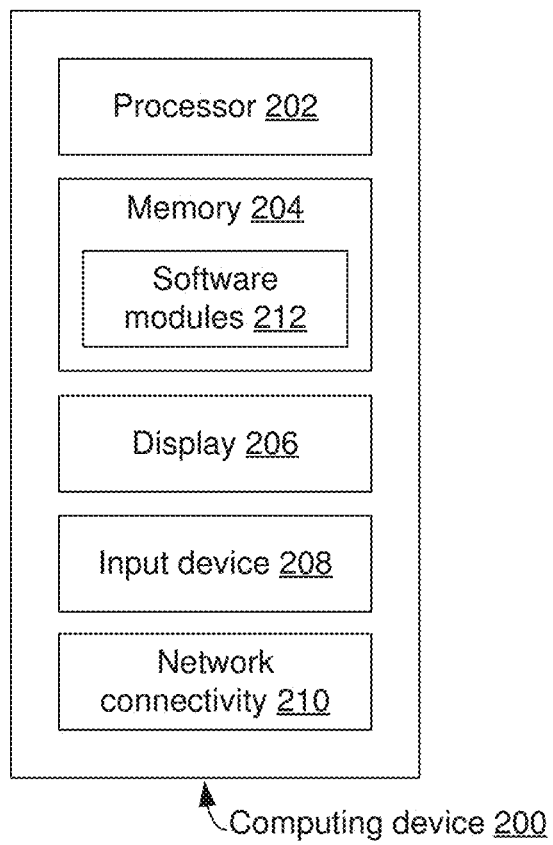
FIG. 2 illustrates a block diagram of various components of a computing device for implementing enhanced mobile subscriber privacy.

FIG. 2 illustrates a block diagram of various components of a computing device for implementing enhanced mobile subscriber privacy.

As depicted, FIG. 2 contains computing device 200. In some embodiments, computing device 200 may be a user device (like user device 102a or user device 102b of FIG. 1) such as a cellular telephone, or a computer server. In some embodiments, instances of computing device 200 may be used to implement Evolved Node B (eNB; sometimes referred to as E-UTRAN Node B, or eNodeB) 106, residential hotspot 108, Mobile Management Entity (MME) 114, evolved packet data gateway (ePDG) 116, Serving Gateway (SGW) 118, Public Data Network (PDN) Gateway (PGW) 120, and HSS 126 of FIG. 1. In some embodiments, instances of computing device 200 may also be used to implement IMSI catcher 128a, IMSI catcher 128b, IMSI catcher 128c, IMSI catcher 128d, IMSI catcher 128e, and IMSI catcher 128f of FIG. 1.

Computing device 200 contains several components, including processor 202, memory 204, display 206, input device 208, and network connectivity 210.

Processor 202 is a microprocessor, such as a central processing unit (CPU) that is configured to execute computer-executable instructions. Memory 204 may be implemented using computer-readable media, such as computer storage media, that is configured to store computer-executable instructions. Computer-readable media includes, at least, two types of computer-readable media, namely computer storage media and communications media.

Computer storage media includes non-transitory volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory and/or storage technology, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Display 206 is a display, such as a liquid crystal display (LCD), that is configured to display visual output by computing device 200. Input device 208 is computer hardware configured to receive and process user input, such as touch input, or physical buttons that a user may press, as with a mouse or keyboard. Where input device 208 is configured to receive tough input, input device 208 and display 206 may together form a touchscreen.

Network connectivity 210 may one or more radios configured to send and/or receive wireless communications. Network connectivity 210 may be configured to send and receive cellular network communications, such as via a LTE, VoLTE, or LTE-u protocol. Network connectivity 210 may also be configured to send wireless local area network communications, such as via a WiFi protocol, or another 802.11 protocol. Network connectivity 210 may also be configured to communicate via physical connection, such as via a Transmission Control Protocol/Internet Protocol (TCP/IP) protocol via an Ethernet cable.

Figure 3:
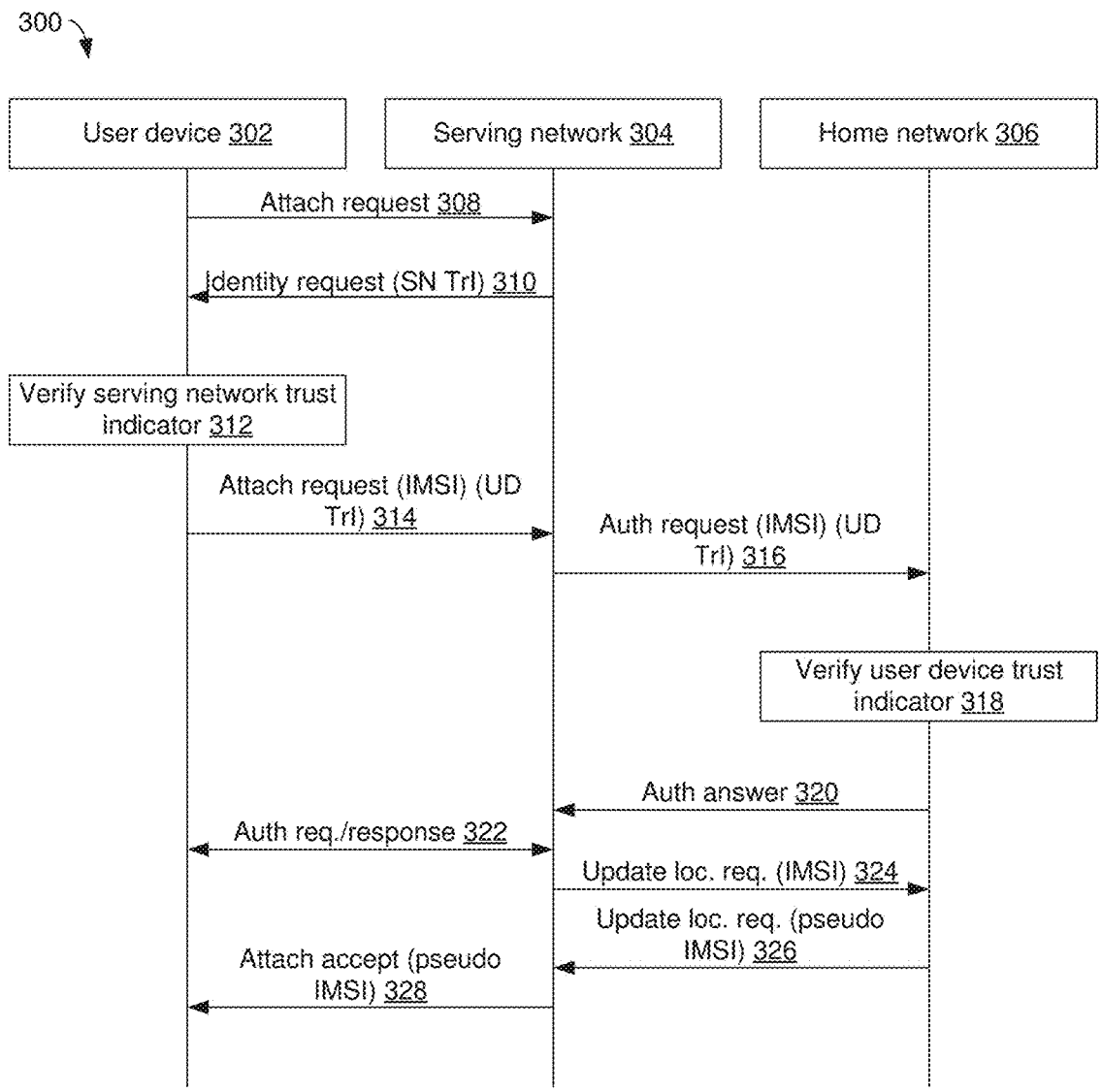
FIG. 3 depicts an example signal flow between a user device, a serving network, and a home network, for the user device registering to the home network where the user device trusts the serving network.
Figure 4:
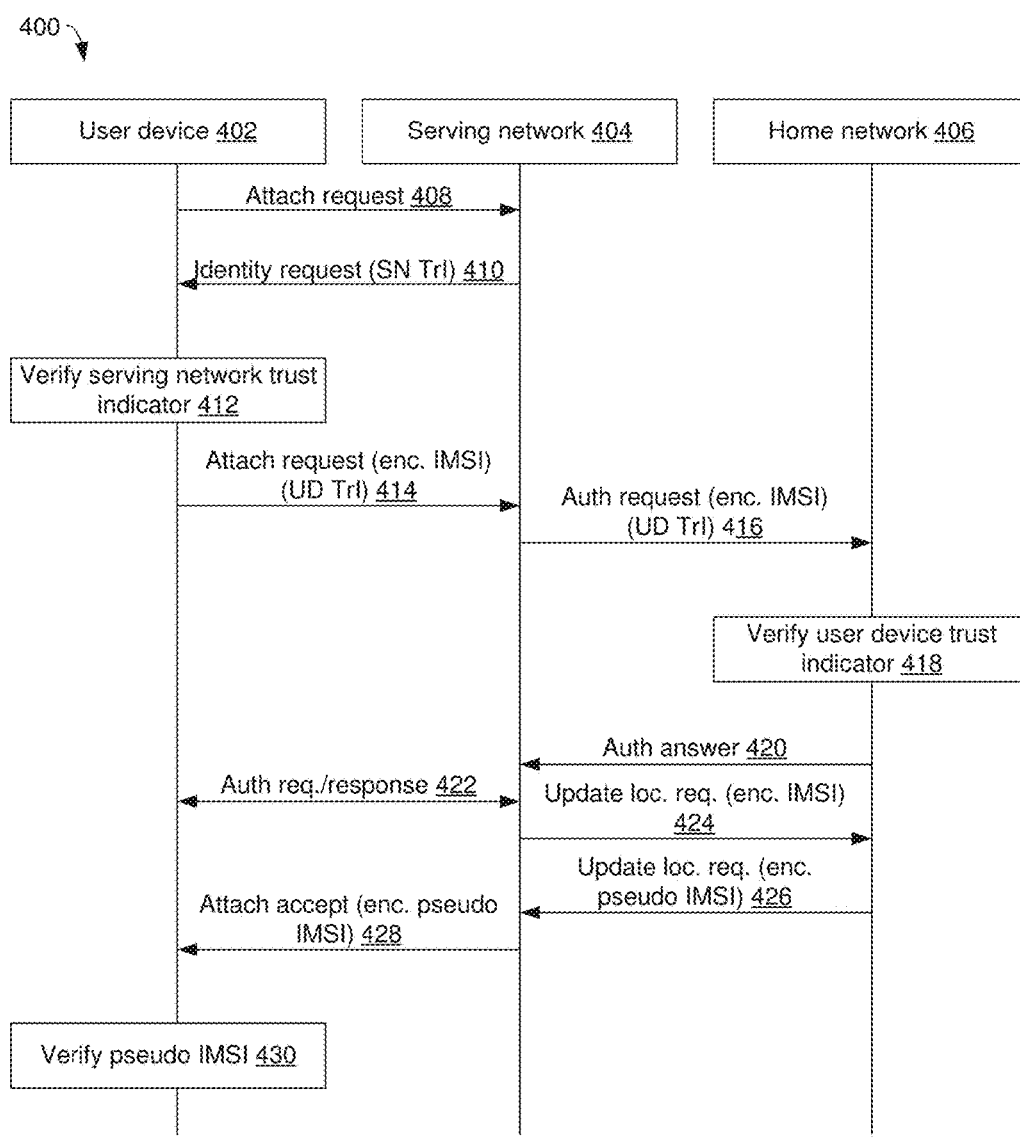
FIG. 4 depicts an example signal flow between a user device, a serving network, and a home network, for the user device registering to the home network where the user device does not trust the serving network.
Figure 5:
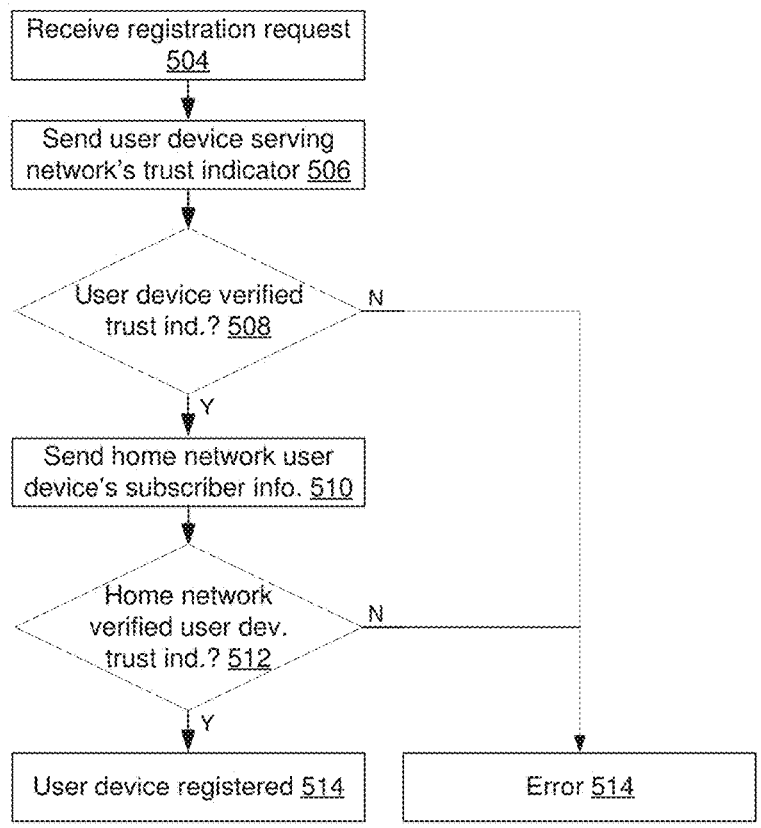
FIG. 5 depicts a flow diagram of example operating procedures for a serving network communicating with a user device and a home network using enhanced mobile subscriber privacy.

One or more instances of the computing device 200 may be used to implement aspects of the disclosure, such as to implement the signal flow of FIGS. 3-4 and the operating procedures of FIG. 5. For example, computer-executable instructions corresponding to at least one of the signal flow of FIGS. 3-4 and the operating procedures of FIG. 5 may be stored in memory 204 and executed by processor 202 as software modules 212 and executed by processor 202. A software module is a set of computer executable instructions stored together as a discrete whole. Examples of software modules include binary executables such as static libraries, dynamically linked libraries, and executable programs. Other examples of software modules include interpreted executables that are executed on a run time such as servlets, applets, p-Code binaries, and Java binaries. Software modules include computer-executable instructions that may run in kernel mode and/or user mode.

Registering a User Device with Enhanced Privacy Where the User Device Trusts the Serving Network FIG. 3 depicts an example signal flow 300 between a user device 302, a serving network 304, and a home network 306, for user device 302 registering to home network 306 where user device 302 trusts serving network 304. In some embodiments, each of user device 302, serving network 304, and home network 306 may be implemented by one or more instances of computing device 200 of FIG. 2. It may be appreciated that the signal flow of FIG. 3 is an example signal flow, and that there may be embodiments that implement more or fewer signals than are depicted, or that implement the signals in a different order than is depicted here.

Signal flow 300 begins with user device 302 sending an attach request 308 to serving network 304. This message may initiate an attach, or registration, procedure.

After receiving attach request 308, serving network 304 sends an identity request 310 to user device 302. This identity request may comprise a trust indicator of the serving network. This trust indicator may be encrypted with the private key of the serving network, so that the user device can decode the serving network's trust indicator with the serving network's public key, to verify that the serving network's trust indicator did originate from the serving network.

After 308, user device 302 verifies the serving network's trust indicator 312. Verifying the serving network's trust indicator may comprise the user device decoding the encrypted trust indicator with the user device's private key. The serving network's trust indicator may comprise a certificate (as described with respect to operation 506 of FIG. 5), and the user device may verify the serving network's trust indicator by determining that it is a valid certificate that is issued by a trusted certificate authority, and that properly indicates the serving network.

After verifying the serving network's trust indicator, user device 302 sends an attach request 314 to serving network 304. This attach request 314 may differ from attach request 308 in that it comprises both the user device's IMSI and a trust indicator of the user device (it may be appreciated that there may be embodiments where the user device's trust indicator is implicit, and so not explicitly transmitted, and this is described in more detail elsewhere).

In some embodiments, the IMSI and user device's trust indicator may be encrypted. As depicted, the IMSI is encrypted with the serving network's public key, so that the serving network can decode the IMSI (the serving network's public key being used because the user device trusts the serving network, in contrast to the embodiment depicted in FIG. 4). Additionally, as depicted, the user device's trust indicator is encrypted with the user device's private key, so that it may be verified (using the user device's public key) that the user device's trust indicator originated from the user device.

After receiving attach request 314, serving network 304 sends an authentication request 316 to home network 306. In some embodiments, authentication request 316 may comprise the IMSI (as decoded by the serving network) and the still-encrypted user device's trust indicator.

After receiving authentication request 316, home network 306 verifies the user device's trust indicator 318. In some embodiments, verifying the user device's trust indicator may be performed in a similar manner as verifying the serving network's trust indicator in 312.

After verifying the user device's trust indicator, home network 306 sends an authorization answer 320 to serving network 304. This authorization answer may indicate to the serving network that the user device is authorized by the home network to be registered.

After receiving authorization answer 320, serving network 304 and user device 302 exchange an authentication request and response 322 that is initiated by serving network 304. This exchange of messages may be initiated by the serving network, and used by the serving network and user device to confirm that the user device has been authorized by the home network.

Serving network 304 sends an update location request 324 to home network 306. This update location request comprises the decoded IMSI, and indicates to the home network to update a location on the telecommunications network where the user device is connecting to the network (here, at the serving network).

After 324, home network 306 sends an update location answer 326 to serving network 304. This update location answer confirms to the serving network that the update location request was successfully processed, and also contains a pseudo IMSI. This pseudo IMSI may be used in place of the IMSI for the duration of the user device's session with the telecommunications network, that is until the user device later registers to the telecommunications network again. Using a pseudo IMSI may increase security because, even if an attacker obtains the pseudo IMSI, the ability of the attacker to use the pseudo IMSI to track the user device may end when the user device re-registers to the telecommunications network and is issued a new pseudo IMSI.

After 326, serving network sends an attach accept 328 to user device 302. This attach accept may comprise the pseudo IMSI that the serving network received in 324, and may indicate to the user device that the user device is registered to use the telecommunications network, and that the user device is to use the pseudo IMSI in place of the IMSI while using the telecommunications network.

After attach accept 328 is received and processed by user device 302, user device 302 is registered to home network 306 and may communicate via home network 306. Additionally, through this signal flow 300 of FIG. 3, the user device's IMSI is protected from an attacker, such as one of the IMSI catchers 128a-f depicted in FIG. 1.

Registering a User Device with Enhanced Privacy Where the User Device Does Not Trust the Serving Network FIG. 4 depicts an example signal flow 400 between a user device 402, a serving network 404, and a home network 406, for user device 402 registering to home network 406 where the user device does not trust serving network 404. In some embodiments, each of user device 402, serving network 404, and home network 406 may be implemented by one or more instances of computing device 200 of FIG. 2. It may be appreciated that the signal flow of FIG. 4 is an example signal flow, and that there may be embodiments that implement more or fewer signals than are depicted, or that implement the signals in a different order than is depicted here.

Signal flow 400 begins with user device 402 sending an attach request 408 to serving network 404. In embodiments, attach request 408 may be implemented in a similar manner as attach request 308 of FIG. 3.

After 408, serving network 404 sends an identity request 410 to user device 402. In embodiments, identity request 410 may be implemented in a similar manner as attach request 310 of FIG. 3.

After 410, user device 402 verifies the serving network's trust indicator 412. In embodiments, verifying the serving network's trust indicator here may be implemented in a similar manner as verifying the serving network's trust indicator 312 of FIG. 3.

After 412, user device 402 sends an attach request 414 to serving network 404. In some embodiments—and in contrast to FIG. 3—here the IMSI is encrypted with the public key of the home network (FIG. 3 depicts the IMSI in attach request 314 being encrypted with the public key of the serving network). This difference between FIG. 3 and FIG. 4 is due to the user device trusting the serving network in FIG. 3 (so encrypting the IMSI with the serving network's public key so that the serving network can decode the IMSI) and the user device not trusting the serving network in FIG. 4 (so encrypting the IMSI with the home network's public key so that the home network can decode the IMSI but the serving network is unable to decode the IMSI). In some embodiments, aside from this difference in the IMSI encrypting, this attach request 414 may be implemented in a similar manner as attach request 314 of FIG. 3.

After 414, serving network 404 sends an authentication request 416 to home network 406. In some embodiments, this authentication request may be implemented in a similar manner as authentication request 316 of FIG. 3, save for the IMSI is sent encrypted (since the serving network lacks the home network's private key, which is used to decode the IMSI).

After 416, home network 404 verifies the user device's trust indicator 418. In some embodiments, verifying the user device's trust indicator may be implemented in a similar manner as verifying the user device's trust indicator 318 in FIG. 3.

After 418, home network 404 sends an authorization answer 420 to serving network 404. In some embodiments, verifying the user device's trust indicator may be implemented in a similar manner as verifying the user device's trust indicator 318 in FIG. 3.

After 420, serving network 404 and user device 402 exchange an authentication request and response 422 that is initiated by serving network 404. In some embodiments, exchanging an authentication request and response may be implemented in a similar manner as exchange an authentication request and response 320 in FIG. 3.

After 422, serving network 404 sends an update location request 424 to home network 406. In some embodiments, this update location request may be implemented in a similar manner as update location request 324 of FIG. 3, save for the IMSI is sent encrypted (since, as in 416, the serving network lacks the home network's private key, which is used to decode the IMSI).

After 424, home network 406 sends an update location answer 426 to serving network 404. In some embodiments, this update location answer may be implemented in a similar manner as update location answer 326 of FIG. 3, save for the pseudo IMSI is sent encrypted. The pseudo IMSI may be encrypted with the user device's public key so that the user device can decode the pseudo IMSI with its private key, but the (untrusted) serving network lacks the ability to decode the pseudo IMSI.

After 426, serving network sends an attach accept 428 to user device 402. In some embodiments, this attach accept may be implemented in a similar manner as attach accept 328 of FIG. 3, save for the pseudo IMSI is sent encrypted. Since the serving network receives the pseudo IMSI in an encrypted format and lacks the configuration to decode the pseudo IMSI, the serving network sends the user device the pseudo IMSI in the encrypted format.

After attach accept 428 is received and processed by user device 402, user device 402 verifies the pseudo IMSI 430. Verifying the pseudo IMSI may comprise the user device decoding the pseudo IMSI with the user device's private key, where the pseudo IMSI also contains a verifiable indication that it was originated by the home network (such as via a certificate, as described in more detail with respect to operation 506).

After verifying the pseudo IMSI 430, the user device is registered to home network 406 and may communicate via home network 406. Additionally, through this signal flow 400 of FIG. 4, the user device's IMSI is protected from an attacker, such as one of the IMSI catchers 128a-f depicted in FIG. 1.

A Serving Network Communicating with a Home Network and a User Device to Register the User Device FIG. 5 depicts a flow diagram of example operating procedures for a serving network communicating with a user device and a home network using enhanced mobile subscriber privacy. It may be appreciated that the operating procedures of FIG. 5 are example operating procedures, and that there may be embodiments that implement more or fewer operations than are depicted, or that implement the operations in a different order than is depicted here.

In some embodiments, the operating procedures of FIG. 5 may be implemented by a serving network (such as serving network 304 of FIG. 3 or serving network 404 of FIG. 4) that is implemented via one or more instances of computing device 200 (such as through computer-executable instructions that are stored in memory 204 and executed by processor 202). It may be appreciated that the description of FIG. 5 involves describing both embodiments where the user device trusts the serving network (such as in FIG. 3), and embodiments where the user device does not trust the serving network (such as in FIG. 4).

In some embodiments, the operating procedures of FIG. 5 (and other aspects of the present disclosure) may be implemented to effectuate a method for securing subscriber information that is associated with a user device in a telecommunications network that comprises a serving network and a home network. In some embodiments, the operating procedures of FIG. 5 (and other aspects of the present disclosure) may be implemented on a system comprising at least one processor, and at least one memory communicatively coupled to the at least one processor, the at least one memory bearing processor-executable instructions that, upon execution by the at least one processor, cause the system at least to perform certain functions. In some embodiments, the operating procedures of FIG. 5 (and other aspects of the present disclosure) may be implemented on a non-transitory computer-readable storage medium, bearing computer-executable instructions that, when executed upon a computing device, cause the computing device at least to perform certain functions.

The operating procedures of FIG. 5 begin with operation 504. Operation 504 depicts receiving a registration request from a user device. A user device (such as user device 302 of FIG. 3) may initiate a registration request by sending attach request 308 to serving network 304. In other embodiments, operation 504 may comprise user device 402 of FIG. 4 sending attach request 408 to serving network 404.

In some embodiments, operation 504 comprises receiving, by the serving network, a request originated by the user device to register the user device to the telecommunications network. After operation 504, the operating procedures of FIG. 5 move to operation 506.

Operation 506 depicts sending a trust indicator of the serving network to the user device. In some embodiments, this trust indicator may be sent as part of an identity request message. For example, serving network 304 of FIG. 3 may send identity request 310 to user device 302, or serving network 404 of FIG. 4 may send identity request 410 to user device 402.

In some embodiments, operation 506 comprises sending, by the serving network to the user device, a trust indicator of the serving network, or sending a user device a trust indicator of a serving network.

In some embodiments, the trust indicator of the serving network comprises information that identifies the serving network. For example, the serving network's trust indicator may be a certificate (sometimes referred to as a public key certificate, identity certificate, or digital certificate). This certificate may identify the serving network and be digitally signed by an issuer (such as a certificate authority or the home network).

In some embodiments, operation 506 comprises sending the user device the trust indicator of the serving network as encrypted with a public key of the user device, the user device being configured to decode the trust indicator of the serving network with a private key of the user device. After operation 506, the operating procedures of FIG. 5 move to operation 508.

Operation 508 depicts determining whether the user device verified the serving network's trust indicator. This may comprise the user device verifying the serving network's trust indicator (such as in 312 of FIG. 3 or 412 of FIG. 4). Then, the user device may send a message to the serving network that permits the serving network to determine that the user device has verified the serving network's trust indicator. This message from the user device may be the attach request message in 314 of FIG. 3 or 414 of FIG. 4.

In some embodiments, the user device may respond to determining that it cannot verify the serving network's trust indicator by halting future communications with the serving network. In these embodiments, the serving network may determine in operation 508 that that the user device did not verify the serving network's trust indicator where there is a timeout—the serving network does not receive a communication from the user device within a predetermined amount of time after sending the user device an identity request.

In some embodiments, operation 508 comprises, in response to the user device having verified the trust indicator of the serving network, receiving, by the serving network and from the user device, an indication of the subscriber information. In some embodiments, this subscriber information may be referred to as subscriber information that is associated with a user device. In some embodiments, this subscriber information may comprise an international mobile subscriber identity (IMSI). Other information can also be used as the subscriber information, such as an International Mobile Equipment Identity (IMEI) or a Mobile Station International Subscriber Directory Number (MSIDSN).

Where in operation 508 it is determined that the user device verified the serving network's trust indicator, then the operating procedures of FIG. 5 move to operation 510. Instead, where in operation 508 it is determined that the user device did not verify the serving network's trust indicator, then the operating procedures of FIG. 5 move to operation 518.

Operation 510 is reached from operation 508 where, in operation 508, it is determined that the user device verified the serving network's trust indicator. Operation 510 depicts sending the home network the user device's subscriber information. In some embodiments, this may comprise serving network 304 sending authentication request 316 to home network 306 in FIG. 3, or serving network 404 sending authentication request 416 to home network 406 in FIG. 4.

In some embodiments, operation 510 comprises decoding the subscriber information before sending the indication of the subscriber information to the home network. This may occur in embodiments where the user device trusts the serving network (such as in FIG. 3), so sends the serving network the subscriber indication as encrypted with a public key of the serving network (in an attach request that indicates that the user device has verified the serving network's trust indicator). Since the serving network has the corresponding private key, it is able to decode the subscriber information.

In some embodiments, operation 510 comprises sending the indication of the subscriber information to the home network in the encrypted form (such as in FIG. 4), the home network being configured to decode the subscriber information. This may occur in embodiments where the user device does not trust the serving network, so sends the serving network the subscriber indication as encrypted with a public key of the home network. Since the serving network lacks the corresponding private key, it is unable to decode the subscriber information (though the home network has the corresponding key, and can decode the subscriber information). After operation 510, the operating procedures of FIG. 5 move to operation 512.

Operation 512 depicts determining whether the home network verified the user device's trust indicator. In some embodiments, a serving network may determine that the home network has verified the user device's trust indicator when it receives an authorization answer, such as in 320 of FIG. 3 or 420 of FIG. 4. In some embodiments, the home network may not respond to the serving network where it cannot verify the user device's trust indicator (which may be determined when no response is received in a predetermined amount of time after the serving network sends the home network an authentication request), or may send the serving network a message indicating that it could not verify the user device's trust indicator.

In some embodiments, the user device's trust indicator may be explicit, that is, it is inserted into communications sent from the user device to the home network via the serving network (such as in attach request 314 and authentication request 316 of FIG. 3, or attach request 414 and authentication request 416 of FIG. 4). That is, in some embodiments, the trust indicator of the user device is part of a communication that is received by the serving network from the user device, and sent from the serving network to the home network.

Where the user device's trust indicator is explicit, the user device may encrypt its trust indicator with the home network's public key. The serving network may receive the user device's trust indicator in this encrypted form, and send it to the home network in this encrypted form. Put another way, in some embodiments, operation 512 comprises sending an indication of the trust indicator of the user device to the home network as encrypted with a public key of the home network, the home network being configured to decode the trust indicator of the user device with a private key of the home network.

In some embodiments, the subscriber information is received in an encrypted form. For example, the user device may have encrypted its trust indicator with a public key of the home network, so that the home network may decode that trust indicator with its private key upon receipt. In some embodiments, the trust indicator of the user device comprises information that identifies the user device. For example, the user device's trust indicator may comprise a certificate, similar to the certificate described above for the serving network's trust indicator.

In contrast to explicit trust indicators, in some embodiments, the user device's trust indicator may be implicit—that is, it is information about the user device that is not sent as a distinct part of a message that is used to convey that it is a trust indicator. For example, the home network may maintain a database of user devices that have previously behaved maliciously on the home network, and use the presence of a user device in this database as an implicit trust indicator that indicates that the user device is not to be trusted.

For another example, the home network may maintain a database of user devices that indicates whether their software has been rooted or not (or may query the user device for this information). In this example, whether the device has been rooted serves as an implicit trust indicator, where rooted user devices are not trusted, and unrooted user devices are trusted. In some embodiments, this use of an implicit trust indicator may be expressed as the trust indicator of the user device comprising information about the user device that is stored in a database by the telecommunications network before the serving network receives a request originated by the user device to register the user device to the telecommunications network.

In some embodiments, the home network may provide a pseudo IMSI to be used in place of an IMSI (or a pseudo IMEI in place of an IMEI, etc.) for a duration of the user device's session with the home network. A pseudo IMSI may then be conveyed between the user device, the home network, and the serving network, so that if an attacker obtains the pseudo IMSI, the attacker will be able to use this information to track the user device for a limited amount of time, since the user device will obtain a new pseudo IMSI the next time it registers to the home network. That is, in some embodiments, operation 512 comprises receiving, by the serving network, second subscriber information, the second subscriber information to be used in place of the subscriber information to identify the user device; and sending, by the serving network, the second subscriber information to the user device, the serving network identifying the user device by the second subscriber information. In some embodiments, the serving network identifies the user device by the second subscriber information for a duration of a communication session of the user device on the telecommunications network.

Put another way, in some embodiments, operation 512 comprises receiving an identifier of the user device from the home network that is distinct from the subscriber information; and sending the identifier of the user device from the home network that is distinct from the subscriber information to the user device, the user device using the identifier of the user device from the home network that is distinct from the subscriber information in communications with the home network.

Returning to a new pseudo IMSI being issued when the user device again registers to the home network, this may be expressed, sending the user device a first identifier of the user device from the home network that is distinct from the subscriber information and that is to be used during the first session; and in response to the first session terminating and starting a second session, send the user device a second identifier of the user device from the home network that is distinct from the subscriber information and that is to be used during the second session.

In some embodiments, this pseudo IMSI may be encrypted by a home network with the public key of the user device, so that the user device may decode the pseudo IMSI with its private key. That is, in some embodiments, the identifier of the user device from the home network that is distinct from the subscriber information is received in an encrypted form and sent to the user device in the encrypted form, the user device being configured to decrypt the identifier of the user device from the home network that is distinct from the subscriber information.

In some embodiments, operation 512 comprises sending the home network an update location request comprising the subscriber information in an encrypted form before receiving an identifier of the user device from the home network that is distinct from the subscriber information. In some embodiments where the user device does not trust the serving network, the serving device may send the encrypted IMSI as part of an update location request, since the home network is configured to decode the IMSI, but the serving network is not.

Where in operation 512 it is determined that the home network verified the user device's trust indicator, then the operating procedures of FIG. 5 move to operation 514. Instead, where in operation 512 it is determined that the home network did not verify the user device's trust indicator, then the operating procedures of FIG. 5 move to operation 518.

Operation 514 is reached from operation 512 where, in operation 512, it is determined that the home network verified the user device's trust indicator. Operation 514 depicts registering the user device to the telecommunications network. Once the user device is registered to the telecommunications network, the user device may use the telecommunications network, such as by making phone calls or transmitting data.

In some embodiments, operation 514 comprises, in response to the home network verifying a trust indicator of the user device, permitting, by the serving network, the user device to communicate via the telecommunications network (which may comprise the home network). After operation 514, the operating procedures of FIG. 5 end.

Operation 518 is reached from operation 508 where it is determined that the user device did not verify the serving network's trust indicator. Operation 518 is also reached from operation 512 where it is determined that the home network did not verify the user device's trust indicator. Operation 518 depicts raising an error. In some embodiments, raising an error may comprise sending a message of the error to the user device and/or home network that there is an error, the message indicating that the registration process will terminate. In other embodiments, raising an error may comprise the serving network logging an indication of the failed registration attempt in a log that is stored in a computer memory of the serving network.

After operation 518, the operating procedures of FIG. 5 end.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for securing subscriber information that is associated with a user device, comprising:
   receiving, by a serving network, a request originated by the user device to register the user device to a home network for a communication session;
   sending, by the serving network to the user device, a first trust indicator of the serving network, the first trust indicator corresponding to a digital certificate that identifies the serving network;
   in response to the user device having verified the first trust indicator, receiving, by the serving network and from the user device, a first encrypted subscriber information that includes a second trust indicator associated with the user device, the first encrypted subscriber information having been encrypted with a first public key of the home network in response to the serving network having been designated by the user device as an untrusted network;
   sending, by the serving network and to the home network, the encrypted first subscriber information;
   in response to the home network decrypting the first encrypted subscriber information and verifying the second trust indicator of the user device, receiving, by the serving network and from the home network, a second encrypted subscriber information that identifies the user device, wherein the second encrypted subscriber information is encrypted with a second public key of the user device in response to the serving network having been designated by the user device as the untrusted network; and
   permitting, by the serving network, the user device to communicate via the home network for the communication session, based at least in part on the second encrypted subscriber information.

2. The method of claim 1, further comprising:
   sending, by the serving network, the second encrypted subscriber information to the user device.

3. The method of claim 1, wherein the first encrypted subscriber information that is associated with the user device comprises an international mobile subscriber identity (IMSI).

4. The method of claim 1, wherein the second trust indicator of the user device comprises information about the user device that is stored in a database by the home network.

5. A system, comprising:
   at least one processor; and
      at least one memory communicatively coupled to the at least one processor, the at least one memory bearing processor-executable instructions that, upon execution by the at least one processor, cause the system at least to:
      send a user device a first trust indicator of a serving network, the first trust indicator corresponding to a digital certificate that identifies the serving network;
      in response to the user device having verified the first trust indicator of the serving network, receive, from the user device, a first encrypted subscriber information that includes a second trust indicator associated with the user device, the first encrypted subscriber information having been encrypted with a first public key of a home network in response to the user device having designated the serving network as an untrusted network;
      send the first encrypted subscriber information to the home network;
      in response to the home network decrypting the first encrypted subscriber information and verifying the second trust indicator of the user device, receive, from the home network, a second encrypted subscriber information that identifies the user device, wherein the second encrypted subscriber information is encrypted with a second public key of the user device in response to the serving network having been designated by the user device as the untrusted network; and permit the user device to communicate via the home network, based at least in part on the second encrypted subscriber information.

6. The system of claim 5, wherein the home network is configured to decode the first encrypted subscriber information with a private key of the home network.

7. The system of claim 5, wherein the instructions that, upon execution by the at least one processor, further cause the system at least to:

send the second encrypted subscriber information to the user device, the second encrypted subscriber information being distinct from the first encrypted subscriber information.

8. The system of claim 5, wherein the user device is configured to decrypt the second encrypted subscriber information.

9. The system of claim 5, wherein the instructions that, upon execution by the at least one processor, further cause the system at least to:

send to the home network an update location request comprising the first encrypted subscriber information before receiving the second encrypted subscriber information.

10. A non-transitory computer-readable storage medium, bearing computer-executable instructions that, when executed upon a computing device, cause the computing device at least to:

send a user device a first trust indicator of a serving network, the first trust indicator corresponding to a digital certificate that identifies the serving network;

in response to the user device having verified the first trust indicator, receive, from the user device, a first encrypted subscriber information that includes a second trust indicator associated with the user device, the first encrypted subscriber information having been encrypted with a first public key of a home network associated with the user device in response to the user device having designated the serving network as an untrusted network;

send the first encrypted subscriber information to the home network;

in response to the home network decrypting the first encrypted subscriber information and verifying the second trust indicator of the user device, receive, from the home network, a second encrypted subscriber information that identifies the user device, wherein the second encrypted subscriber information is encrypted with a second public key of the user device in response to the serving network having been designated by the user device as the untrusted network; and permit the user device to communicate via a telecommunications network that comprises the home network, based at least in part on the second encrypted subscriber information.

11. The non-transitory computer-readable storage medium of claim 10, wherein the home network is configured to decode the second trust indicator of the user device from the first encrypted subscriber information with a private key of the home network.

12. The non-transitory computer-readable storage medium of claim 10, wherein the second trust indicator of the user device comprises information about the user device that is stored in a database by the telecommunications network.

13. The method of claim 1, wherein the second encrypted subscriber information includes a pseudo international mobile subscriber identity (IMSI).

14. The method of claim 1, further comprising:

sending, to the home network, an update location request comprising the first encrypted subscriber information, prior to receiving the second encrypted subscriber information.

15. The method of claim 1, wherein the communication session is a first communication session and further comprising:

in response to the first communication session terminating and starting a second communication session, sending the user device a third encrypted subscriber information that is distinct from the first encrypted subscriber information and the second encrypted subscriber information, wherein validity of the third encrypted subscriber information is restricted to a duration of the second communication session.

16. The system of claim 5, wherein the instructions that, upon execution by the at least one processor, further cause the system to at least:

receive, by the serving network, a request originated by the user device to register the user device to the home network for a communications session, and wherein, to permit the user device to communicate via the home network is associated with the communication session.

17. The system of claim 5, wherein the second trust indicator of the user device comprises information about the user device that is stored in a database by the home network.

18. The non-transitory computer-readable storage medium of claim 10, further bearing computer-executable instructions that, when executed upon the computing device, cause the computing device at least to:

send, to the home network, an update location request comprising the first encrypted subscriber information, prior to receiving the second encrypted subscriber information.

19. The non-transitory computer-readable storage medium of claim 10, further bearing computer-executable instructions that, when executed upon the computing device, cause the computing device at least to:

receive a request originated by the user device to register the user device to the home network for a communication session, and wherein, to permit the user device to communicate via the telecommunications network is associated with the communication session.

20. The non-transitory computer-readable storage medium of claim 19, wherein the communication session is a first communication session and wherein the user device communicates via the telecommunications network as part of the first communication session, and further bearing computer-executable instructions that, when executed upon the computing device, cause the computing device at least to:

in response to the first communication session terminating and starting a second communication session, send the user device a third encrypted subscriber information that is distinct from the first encrypted subscriber information and the second encrypted subscriber information, wherein validity of the third encrypted subscriber information is restricted to a duration of the second communication session.

* * * * *